Dec. 5, 1961     L. J. JOHNSON     3,012,185
FREQUENCY CONTROL APPARATUS FOR ALTERNATORS
Filed March 14, 1960     6 Sheets-Sheet 1

FIG. 1.

INVENTOR.
LEOPOLD J. JOHNSON
BY
Christie, Parker & Hale
ATTORNEYS

Dec. 5, 1961  L. J. JOHNSON  3,012,185
FREQUENCY CONTROL APPARATUS FOR ALTERNATORS
Filed March 14, 1960  6 Sheets-Sheet 2
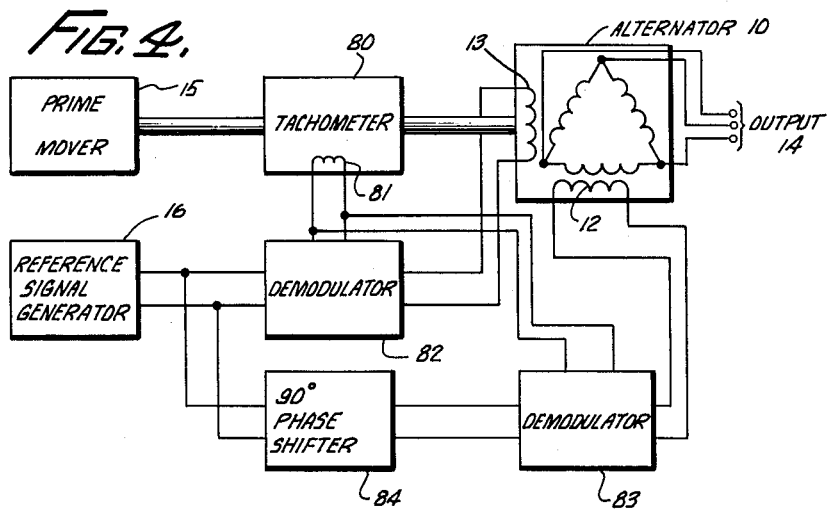
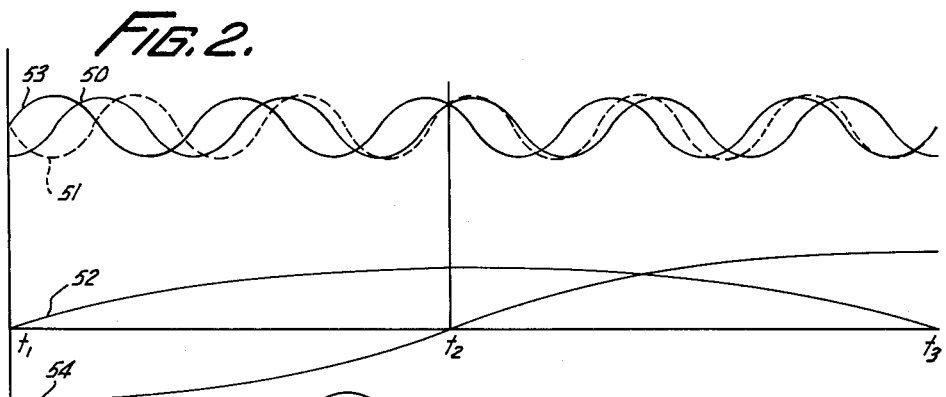
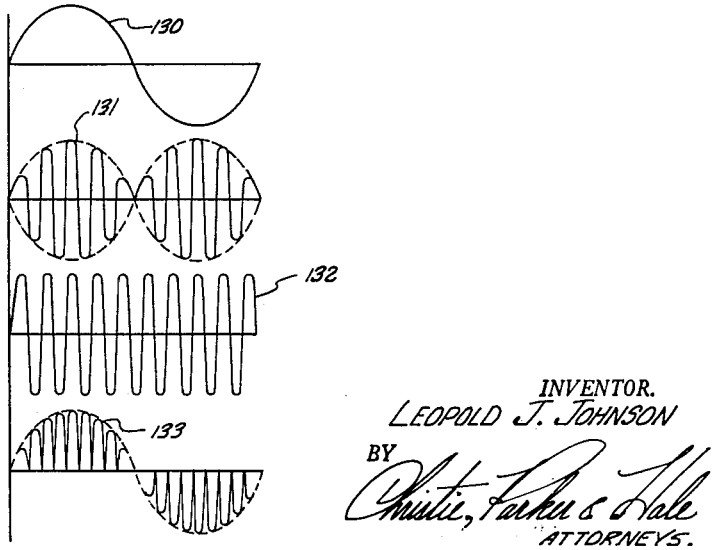
INVENTOR.
LEOPOLD J. JOHNSON
BY
*Christie, Parker & Hale*
ATTORNEYS.

Dec. 5, 1961 L. J. JOHNSON 3,012,185
FREQUENCY CONTROL APPARATUS FOR ALTERNATORS
Filed March 14, 1960 6 Sheets-Sheet 3
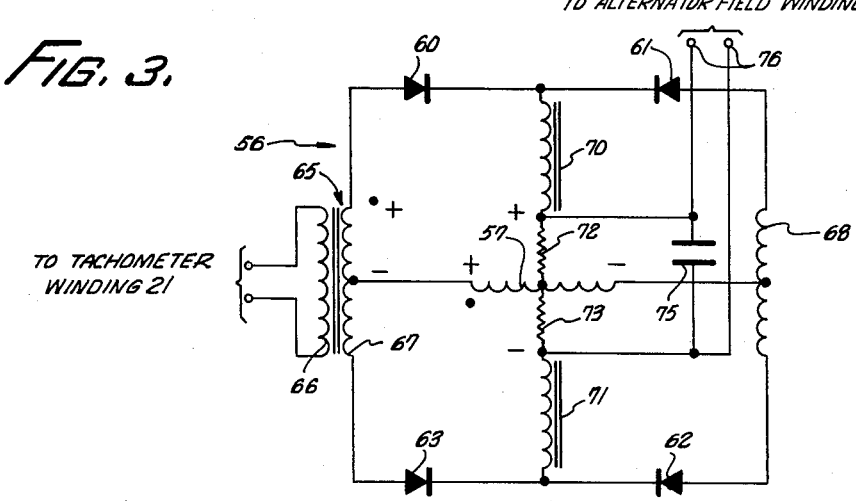
FIG. 3.
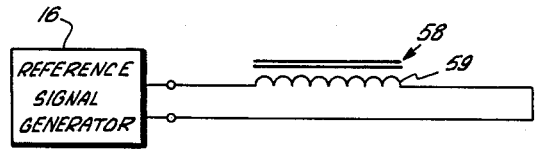
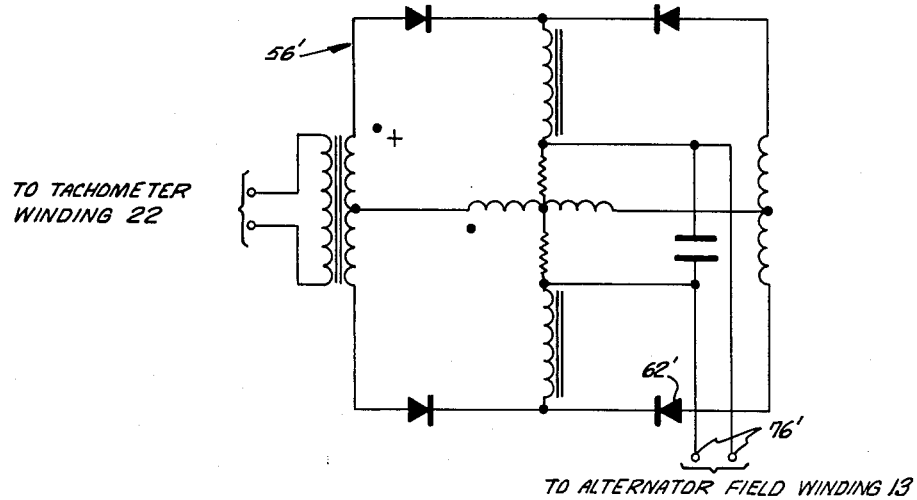
INVENTOR.
LEOPOLD J. JOHNSON
BY
ATTORNEYS.

INVENTOR.
LEOPOLD J. JOHNSON

Dec. 5, 1961 L. J. JOHNSON 3,012,185
FREQUENCY CONTROL APPARATUS FOR ALTERNATORS
Filed March 14, 1960 6 Sheets-Sheet 6

INVENTOR.
LEOPOLD J. JOHNSON
BY
Christie, Parker & Hale
ATTORNEYS.

United States Patent Office 3,012,185
Patented Dec. 5, 1961

3,012,185
FREQUENCY CONTROL APPARATUS FOR ALTERNATORS
Leopold J. Johnson, Santa Ana, Calif., assignor to The Siegler Corporation, Anaheim, Calif., a corporation of Delaware
Filed Mar. 14, 1960, Ser. No. 14,808
15 Claims. (Cl. 322—32)

This invention relates to apparatus for controlling the frequency of alternating current which is produced by an alternator.

Controlled frequency alternator systems are known in which the frequency of the alternating current produced by an alternator is controlled by varying the direction and speed of rotation of the magnetic field for the armature of the alternator in a predetermined manner. For example, the field structure of the alternator may be constructed in the same manner as the stator in an induction motor. By providing polyphase field windings for the alternator and energizing the windings with polyphase alternating current, the rate of rotation of the field for inducting the armature frequency can be controlled independently of the shaft speed of the alternator. See U.S. Patent No. 2,854,617 which was granted to L. J. Johnson on September 30, 1958.

Controlled frequency alternator systems are very useful in producing alternating current of a predetermined frequency regardless of variations in the speed of the alternator by providing an independently controlled velocity field passing the armature poles. The electrical power delivered to the load from the armature of such a controlled frequency alternator is derived from the two sources which produce the velocity of the rotating field, namely the shaft which drives the alternator and the source of power for field windings of the alternator. The shaft power delivered to the alternator is directly proportional to the speed of rotation of the shaft (torque × speed) when the output load is fixed. Thus if the shaft speed is above or below synchronous speed (the speed at which the shaft supplies the entire load power) the source of power for field windings of the alternator must supply the additional power to the load or receive power from the shaft.

For example, if the shaft is rotating at one-half synchronous speed the source of power for the field windings must supply one-half the load power plus excitation losses. Many problems have been encountered heretofore in providing an efficient source of power for the field windings of the alternator which is capable of handling large amounts of power. The problems become more severe where weight and space is a factor such as in aircraft applications.

Prior art controlled frequency alternator system which employ an alternator having a polyphase armature have encountered an additional and very important problem. This problem is concerned with the phase voltage balance of the armature output with unbalanced loads. When the polyphase armature of an alternator is connected to an unbalanced load, the currents in the individual phases of the armature are unequal resulting in armature reaction which distorts the waveform of the magnetic flux that links the armature and field poles and in particular produces reverse or negative sequence flux. The negative sequence flux revolves oppositely to the rotor of the alternator and therefore cuts the rotor windings at twice the normal frequency. This negative sequence flux induces undesirable negative sequence voltages in the armature and in the field windings of the alternator and causes the output voltages in the different phases of the armature to be unequal.

In conventional alternators, amortisseur or damper windings (short-circuited squirrel cage windings) are built around and into the poles on the rotor to compensate for such armature reaction and negative sequence flux by generating flux which opposes the negative sequence flux. However, damper windings can only be utilized in an alternator when the damper windings are stationary in space relative to the field. Since the field in an alternator employed in a controlled frequency alternator system may rotate relative to the rotor, damper windings cannot be utilized to compensate for armature reaction and negative sequence flux. As a result, elaborate and complex voltage balancing circuits and filters have been connected heretofore to the polyphase armature output of controlled frequency alternator systems to improve the phase voltage balance with unbalance loads. Such voltage balancing circuits are expensive and at best only partially compensate for phase voltage unbalance.

These difficulties are overcome in the present invention by providing an alternator having a polyphase armature and a two-phase magnetic field and controlling the magnetic field directly so as to compensate for armature reaction and negative sequence voltages. The field windings of the two-phase field of a non-salient pole alternator are wound in quadrature (overlapping). I have discovered that such field windings act to compensate for armature reaction and induced negative sequence voltages if the windings are continuously connected to a low impedance which allows negative sequence currents to flow through the field windings thereby generating flux which opposes the negative sequence flux and restoring the sinusoidal waveform of the field for the armature when the alternator is delivering power to an unbalanced load.

In accordance with the present invention, a non-salient pole alternator having a polyphase armature and a plurality of field windings for producing a polyphase magnetic field for the armature is coupled to a driving means. Control means and reference signal generating means are coupled to the field windings to control the direction and speed of rotation of the magnetic field and thereby the frequency of the alternating current output. The control means is arranged to continuously provide a low impedance path to currents induced in the field windings to compensate for armature reaction. By way of example, the control means may include a generator coupled to the driving means and having one or more low impedance armature windings which are continuously connected by a phase-sensitive demodulator to the field windings of the alternator in one polarity sense or the other to control the direction and speed of rotation of the magnetic field and permit induced negative sequence currents to flow through the windings of the generator.

The control apparatus of the present invention is light weight, simple, reliable and capable of efficiently supplying large amounts of polyphase power with a minimum of voltage waveform distortion to a load at any preselected frequency.

The present invention is described in more detail in reference to the accompanying drawings in which:

FIG. 1 is a schematic circuit diagram partially in block form of one embodiment of the present invention;

FIG. 2 is a graph illustrating the waveforms of certain signals present in the apparatus of FIG. 1;

FIG. 3 is a schematic circuit diagram of a two-phase demodulator which may be utilized in the apparatus of this invention;

FIG. 4 is a block diagram of a modification of the apparatus of FIG. 1;

FIG. 6 is a graph illustrating the waveforms of certain signals present in the apparatus of FIG. 5;

Figure 5:
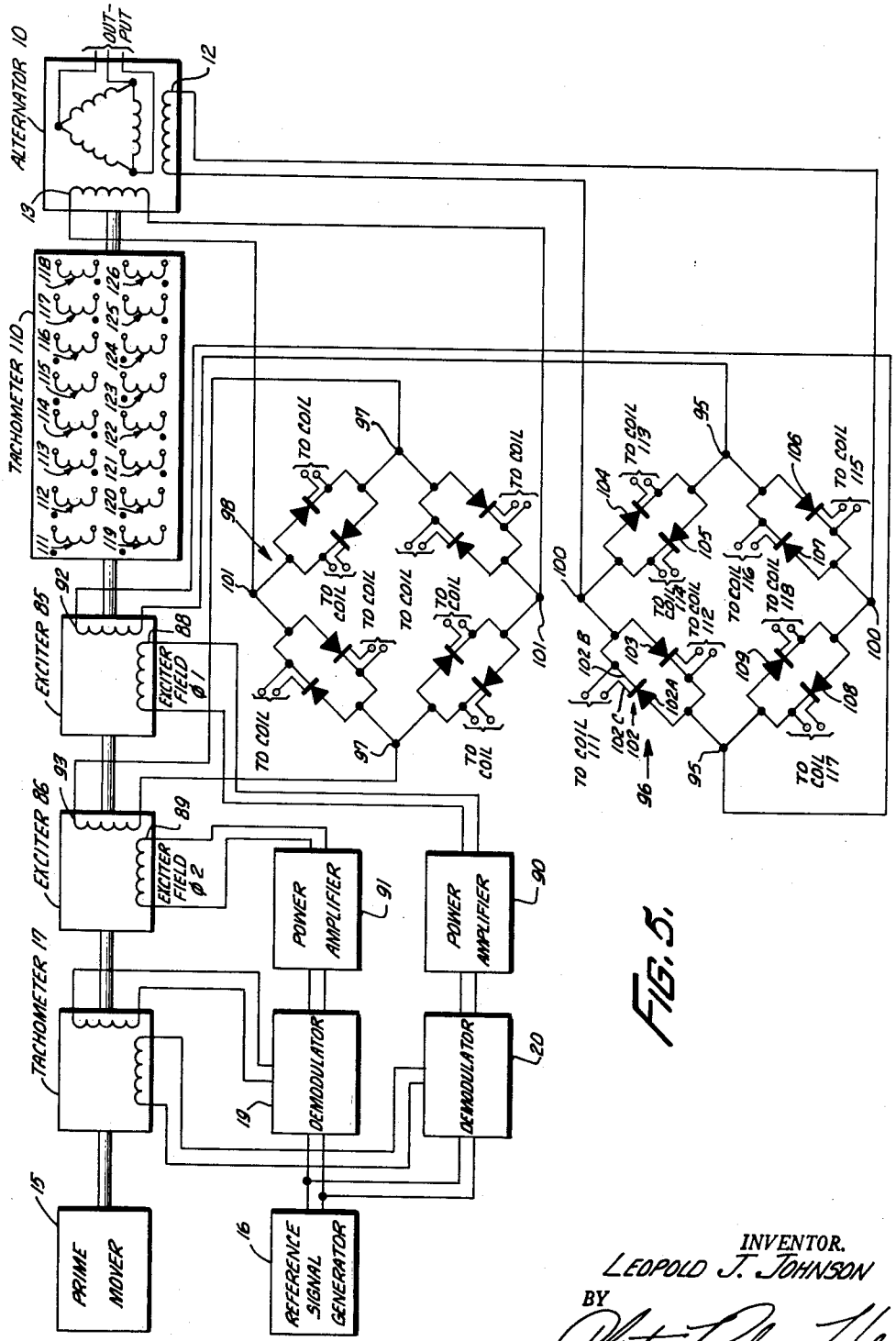
FIG. 5 is a schematic circuit diagram partially in block form illustrating another embodiment of the present invention.

Referring now to the drawings and more particularly to FIG. 1, there is illustrated a non-salient pole alternator 10 having a polyphase armature 11 with an output 14 and two field windings 12 and 13 for producing a two-phase magnetic field for the armature 11. The alternator 10 may be of the rotating or stationary armature type. A prime mover 15 is coupled to the alternator for producing rotary motion between the armature and field windings thereof. A reference signal generator 16 such as an electronic oscillator is provided for producing a first reference signal of a predetermined frequency. The first reference signal may have a constant frequency or a variable frequency depending upon the desired output frequency from the alternator 10 as will be more fully described. Control means which include a tachometer 17 and a pair of phase-sensitive demodulators 19 and 20 are coupled between the reference signal generator 16 and the field windings 12 and 13 of the alternator for applying signals to the field windings to control the direction and speed of rotation of the magnetic field and thereby control the frequency of alternating current which is produced by the armature 11. The tachometer 17 which includes winding 21 is coupled to the prime mover 15 for producing a second reference signal that is proportional to the alternator speed. The tachometer 17 also includes an additional winding 22 which is separated from the winding 21 by 90 electrical degrees to produce a third reference signal which is 90 degrees (90°) out of phase with the second reference signal. The tachometer windings 21 and 22 are coupled to input circuits 23 and 24 of phase-sensitive demodulators 19 and 20 respectively.

The demodulators 19 and 20 are identical and each includes four transistors connected in a well known bridge arrangement. The demodulator 19 includes transistors 25—28 and current limiting resistors 30 and 33 which are connected in series with the base electrodes of the respective transistors 25—28 as shown. The power input terminals 23 are connected to the collector electrodes of transistors 25—28 and a pair of output terminals 35 are connected to the emitter electrodes of the transistors as illustrated.

The reference signal generator 16 is coupled to a primary winding 36 of a transformer 37 which includes secondary windings 38—45. The windings 36 and 38—45 are arranged as shown by the conventional dot polarity markings. The windings 38—45 are coupled to the control input terminals of the demodulators 19 and 20 as will be more fully described. The windings 38 and 39 are coupled across the base and emitter electrodes of transistors 25 and 27 and windings 40 and 41 are coupled across the base and emitter electrodes of transistors 26 and 28. This causes transistors 25 and 27 to be conducting when the polarity of the first reference signal is positive and transistors 26 and 28 to be conducting when the polarity of the first reference signal is negative. Windings 42—45 are coupled to the transistors of the demodulator 20 in the same manner as indicated in FIG. 1.

The transistors of the demodulators 19 and 20 are arranged so that current may flow in either direction through the transistors. When the signals generated in the tachometer winding 21 and the winding 36 are in phase, the voltage across output terminals 35 of the demodulator 19 or across the alternator field winding 13 is positive. When the signals in the tachometer winding 21 and the winding 36 are out of phase, the voltage across the alternator field winding 13 is negative or in the opposite direction. When the signals generated in the tachometer winding 21 and the signal generator 16 are 90 degrees (90°) out of phase, the average output signal from the demodulator 19 is zero. The demodulator 20 operates in the same manner.

The demodulators 19 and 20 obtain the algebraic sum and difference between the signals produced in the tachometer windings and the signal produced by the reference signal generator 16. For example, consider the graph of FIG. 2 wherein the curve 50 represents the output signal from the tachometer winding 21 and curve 51 represents the output signal from the reference signal generator 16. At time $t_1$, the signals 50 and 51 are 90 degrees (90°) out of phase and the resulting output signal from the demodulator 19 (indicated at 52 in FIG. 2) is zero. At time $t_2$ the signals 50 and 51 are in phase and the signal 52 has a maximum positive value. At time $t_3$ signals 50 and 51 are again 90 degrees (90°) out of phase and the amplitude of signal 52 is again zero. FIG. 2 thus illustrates the manner in which demodulator 19 obtains the difference frequency between the sinusoidal signals. FIG. 2 represents only one-half wave of the difference frequency signal 52. The curve 53 of FIG. 2 represents the signal which is produced by the tachometer winding 22 and the curve 54 represents the output signal from the demodulator 20. The demodulators 19 and 20 are thus arranged to produce a sinusoidal output signal having a frequency that is the difference between the frequencies of the two sinusoidal signals applied to the inputs of the demodulators.

The alternating current signals applied to the alternator field windings 12 and 13 result in a rotating magnetic field (relative to the field windings) to cause the output 14 of the armature 11 to have a frequency which is proportional to the frequency of the reference signal produced by the generator 16. If the reference signal generator 16 produces a constant frequency signal the armature output 14 also have a constant frequency regardless of changes in speed of the prime mover 15.

The tachometer field windings 21 and 22 are arranged to provide a low impedance current path to negative sequence currents which are induced in the alternator field windings 12 and 13. Since the demodulator 19 and 20 continuously connect the field windings 12 and 13 across the tachometer windings 21 and 22, respectively (in one polarity sense or the other depending upon the phase relationship of the signals 50, 51 and 53), a low impedance current path is continuously provided for such induced negative sequence currents. The negative sequence currents which flow in the alternator field windings 12 and 13 cancel the negative sequence flux which results when the alternator output 14 is connected to an unbalanced load. The tachometer windings 21 and 22 should have an impedance (at the frequency of the output 14) which is lower than the impedance of the alternator field windings 12 and 13 and preferably the tachometer windings should have an impedance which is less than one-half of the impedance of the respective alternator field winding. Such low impedance tachometer windings may be obtained by providing a low number of turns in the windings or by providing a lap or compound windings.

Referring now to FIG. 3 there is illustrated an alternative embodiment of a two-phase demodulator which may be utilized in the apparatus of FIG. 1. The two-phase demodulator of FIG. 3 includes a pair of identical single-phase demodulators 56 and 56' which have reference signal windings 57 and 57' that are coupled to a common transformer 58, the primary 59 of which is connected to the signal generator 16. The demodulators 56 and 56' are conventional and it is not considered necessary to discuss the individual components of each in detail. It is sufficient to point out that demodulator 56 includes diodes 60—63 and a transformer 65 having a primary winding 66 coupled to the tachometer winding 21 and secondary windings 67 and 68 connected to the anodes of diodes 60—63 as shown. Chokes 70 and 71 and resistors 72 and 73 are connected in series between the cathodes of the diodes 60 and 61 and 62 and 63 as shown. A center tap of winding 57 is connected to the junction of resistors 72 and 73. A capacitor 75 is connected across the output terminal 76 which is coupled across resistors 72 and 73 as shown. The output terminal 76 is connected to the alternator field winding 12 and the output terminals 76' of the demodulator 56' are connected to the alternator field winding 13 as illustrated.

An alternative embodiment of a constant frequency control apparatus is illustrated in FIG. 4 wherein a tachometer 80 is provided with a single winding 81 which is coupled to the power input terminals of demodulators 82 and 83. A 90° phase shifting network 84 is coupled between the reference signal generator 16 and the control input terminals of the demodulator 83 to shift the phase of the first reference signal by 90°. The demodulators 82 and 83 may be the same as the demodulators 56 and 56' or 19 and 20. If the demodulators 82 and 83 are similar to demodulators 19 and 20 of FIG. 1, the phase shifting network 84 must shift the phase of each of the signals from windings 42—45.

FIG. 5 illustrates a modified embodiment of the present invention in which a pair of exciters 85 and 86 are coupled to the shaft of the prime mover 15 for supplying the required power to the field windings of the alternator 10. The exciter 85 supplies the power to the field winding 12 or phase 1 of the alternator field and the exciter 86 supplies the power to alternator field winding 13 or phase 2 of the alternator field. The exciters 85 and 86 include field windings 88 and 89 respectively which are coupled to demodulators 20 and 19 by means of power amplifiers 90 and 91. The field windings 88 and 89 are excited by signals which are 90° out of phase and which have a frequency that is equal to the difference between the frequencies of the signals produced by the signal generator 16 and by the windings of the tachometer 17. The exciters 85 and 86 include armature windings 92 and 93 which produce output signals in the form of a single side band suppressed carrier modulated wave that changes phase when the signals applied to the field windings of the respective exciter change polarity. The frequency of the modulated wave is proportional to the speed of rotation of the armature windings of the exciter relative to the field windings thereof and the frequency of the modulating wave is equal to the frequency applied to the field windings of the exciters. Since the signals applied to the exciter field windings are 90° out of phase, the modulating wave in the output of the armature windings 92 and 93 will also be 90° out of phase.

The armature windings 92 and 93 of the exciters 85 and 86 are connected to input terminals 95 and 97, respectively, of controlled rectifier bridge demodulators 96 and 98. The demodulators 96 and 98 include output terminals 100 and 101 which are connected to the alternator field windings 12 and 13, respectively. The demodulators 96 and 98 are identical and accordingly only the components of demodulator 96 will be described in detail.

The demodulator 96 includes eight controlled rectifiers 102—109. Such controlled rectifiers are well known and function in a manner similar to a thyratron. For example, consider the controlled rectifier 102. When a predetermined positive control signal is applied across the control electrode 102A and the cathode electrode 102B the rectifier is placed in condition to conduct and is rendered conducting when the anode electrode 102A is positive with respect to the cathode 102B. The controlled rectifier 102 will continue to conduct until the potential across the anode and cathode electrodes goes to zero or negative. A tachometer 110 including windings 111—126 (which are wound to produce signals in accordance with the dot polarity markings as shown) is coupled to the shaft that drives the exciters 85 and 86 so that the signals generated in the windings 111—126 have the same frequency as the signals produced by the exciter armature windings 92 and 93. The signals generated in the windings 111—126 are either in phase or out of phase with the signals generated in the exciter armature windings 92 and 93 as will be more fully described. The tachometer windings 111—126 are connected across the control and cathode electrodes of the controlled rectifiers of the demodulators 96 and 98 as shown in FIG. 5 to render opposite arms of the rectifier bridge conducting at any one time. For example the controlled rectifiers 102, 103, 106 and 107 are placed in condition to conduct when the signals generated in windings 111, 112, 115 and 116 are positive and diodes 104, 105, 108 and 109 are placed in condition to conduct when the signals generated in windings 113, 114, 117 and 118 are positive.

The operation of the exciters 85 and 86 and the demodulators 96 and 98 is described in more detail in reference to FIG. 6. Curve 130 of FIG. 6 represents the difference frequency signal which is applied to the exciter field winding 88. This difference frequency signal 130 modulates the high frequency signal generated in the armature winding 92 of the exciter 85 to produce a signal 131 (FIG. 6) which is in the form of a single side band suppressed carrier signal. The signal 131 changes phase each time the difference frequency signal 130 changes polarity. Each of the windings of the tachometer 110 produces a signal 132 as shown in FIG. 6 (or a signal 180° out of phase with the signal 132 depending upon the polarity markings) which has the same frequency as the carrier wave of signal 131. The signal 132 is utilized to control the controlled rectifiers of the demodulators 96 and 98 so that opposite arms of the bridge arrangement of these demodulators are rendered conducting for each polarity of the carrier signal 132. As a result the output signal from the demodulator 96 which is applied to the alternator field winding 12 is in the form of signal 133 of FIG. 6. Thus the signal applied to the field winding 12 has the same frequency and a predetermined phase relationship with the difference frequency signal 130 which is applied to the exciter field winding 88. The signal applied to the alternator field winding 13 is 90° out of phase with the signal applied to the field winding 12.

The exciter armature windings 92 and 93 should have an impedance that is lower than the impedance of windings 12 and 13 and preferably an impedance which is less than one-half of the impedance of the field windings 12 and 13. To provide this low impedance, the exciter armature windings 92 and 93 may be wound with a low number of turns or by a suitable lap or compound winding arrangement.

The exciters 85 and 86 may be driven by a separate prime mover but preferably are driven by the same prime mover which supplies power to the alternator 10. The exciters 85 and 86 provide a highly effective field for the alternator 10 and of course may be designed to furnish any amount of required power to compensate for variations in speed in the primer mover 15. For example, when the prime mover is driving the alternator below the synchronous speed or the speed at which the difference frequency signal is direct current, exciters 85 and 86 must supply a portion of the load power as well as the excitation losses to the alternator field windings. When the prime mover 15 is operating above synchronous speed, the exciters 85 and 96 receive power from the alternator field windings and function as motors instead of generators. If the exciters 85 and 86 are coupled to the same shaft that drives the alternator 10, this power will be returned to the shaft and utilized to drive the alternator. This results in a very efficient system which is capable of supplying large amounts of power to a load at a constant frequency regardless of changes in the speed of the prime mover which drives the alternator. Since the excitation losses in the alterntaor field windings are essentially independent of shaft speed and the power flow between the alternator and the exciters is reversible, the system provides essentially constant efficiency over the entire operating speed range.

Figure 7:
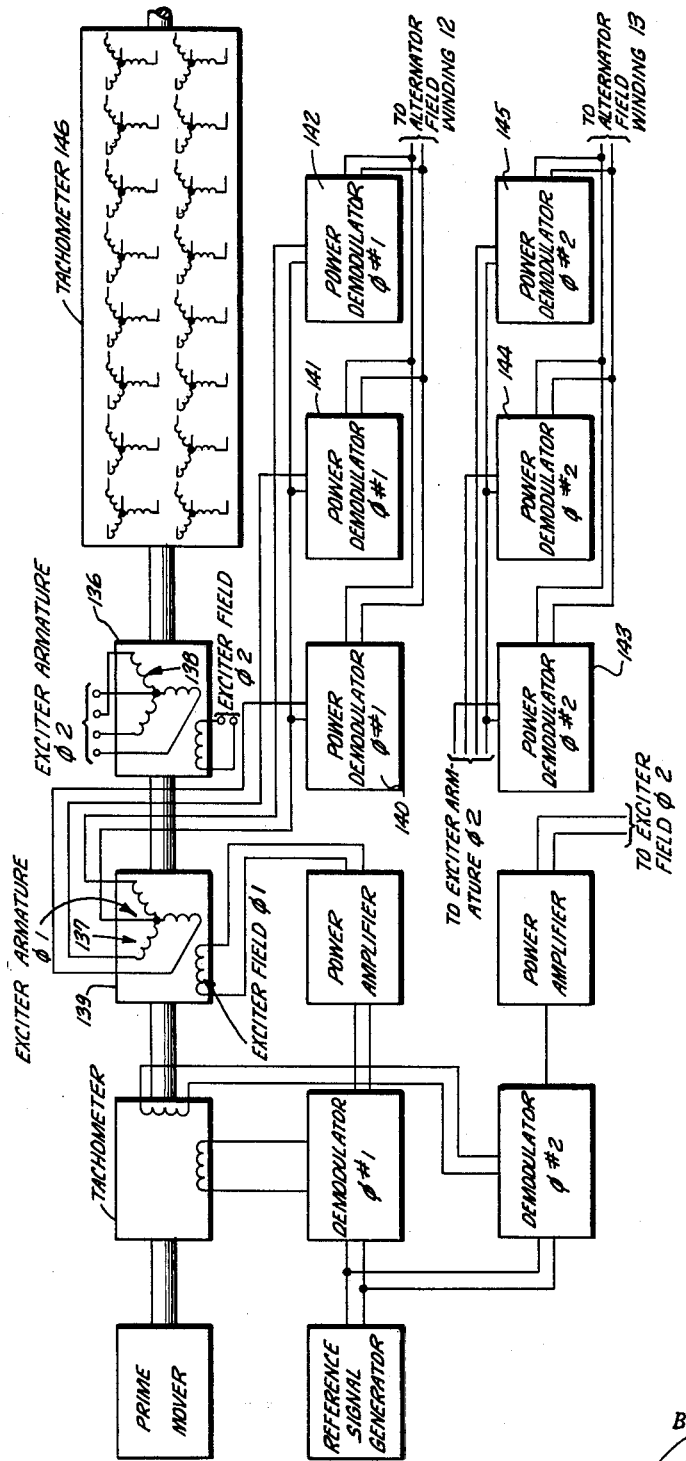
FIG. 7 is the preferred embodiment of the present invention.

FIG. 7 illustrates a modification of the apparatus shown in FIG. 5 wherein a pair of exciters 135 and 136 having three-phase armature windings 137 and 138 are provided for furnishing the power to the field windings of the alternator 10 (not shown). The three-phase signals generated in the armatures of exciters 135 and 136 are demodulated by power demodulator 140—145 and then applied to the alternator field windings. Each of the power demodulators 140 and 145 may be identical to the demodulator 96 of FIG. 5. A tachometer 146 with sixteen three-phase windings is coupled to the shaft that drives the exciters 135 and 136 for supplying control signals to the demodulators 140—145. One phase of each of eight windings is coupled to each of the demodulators 140—145 in a conventional manner so that the output signals of the demodulator 140—142 and 143—145 may be connected in parallel to supply power to the alternator field windings 12 and 13 as shown. By providing three-phase windings for the exciter armatures, the ripple content of the signal applied to the alternator field windings is appreciably reduced. Each of the armature windings of the exciters 136 and 139 are designed to have an impedance which is less than the impedance of the field windings of the alternator and preferably the exciter armature windings have an impedance which is less than one-half of the impedance of the alternator field windings.

Figure 8:
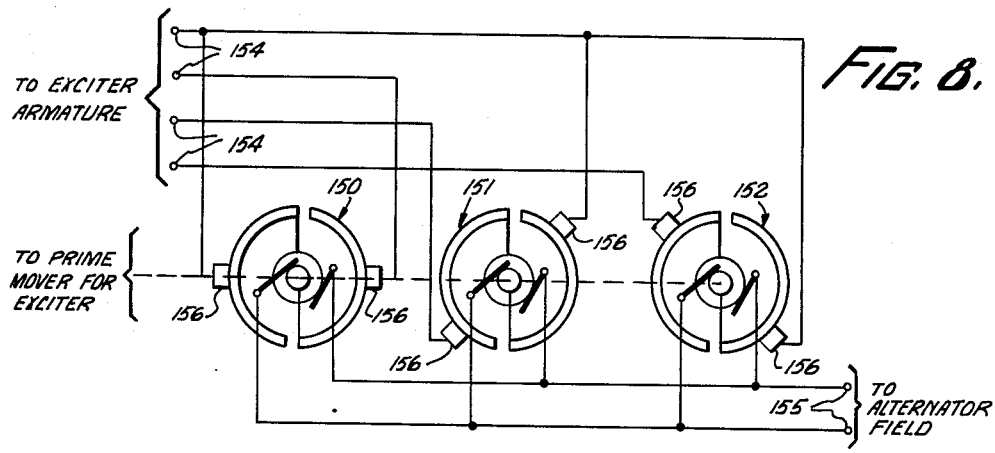
FIG. 8 is a schematic circuit diagram of a three-phase commutator type demodulator that may be used in the apparatus of FIG. 7.

FIG. 8 illustrates a three-phase full-wave commutator type demodulator that may be utilized in the apparatus of FIG. 7. The demodulator of FIG. 8 includes three commutators 150, 151 and 152 which are coupled to the shaft of the prime mover that drives the exciters of 136 and 139 of FIG. 7, as illustrated by the broken line in FIG. 8. Only one three-phase demodulator is illustrated in FIG. 8 and two such demodulators are required in the apparatus of FIG. 7 to demodulate the armature outputs of the exciters 136 and 139. The commutators 150, 151 and 152 are coupled between a four-terminal input circuit 154 and a two-terminal output circuit 155. The input circuit 154 is connected to the exciter armature of one of the exciters 136 and 139 and the output circuit 159 is coupled to one phase of the alternative field winding in a well-known manner. The brushes 156 of the respective commutators 150—152 are phase shifted 120° with respect to each other as shown to provide a single phase output across the terminals 155.

Figure 9:
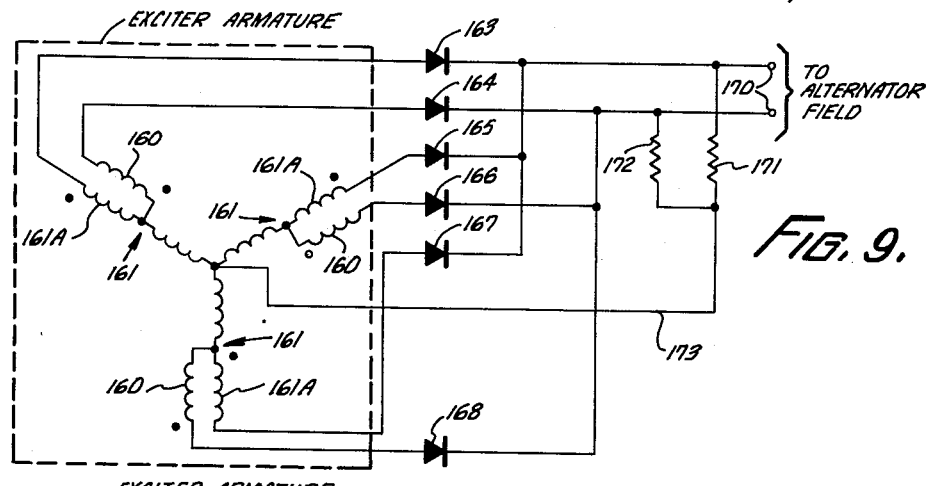
FIG. 9 is a schematic circuit diagram of a three-phase half-wave demodulator that may be utilized in the apparatus of FIG. 7.

FIG. 9 illustrates a half-wave three-phase demodulator which may be utilized in the apparatus of FIG. 7, to demodulate the three-phase output from the exciter armatures. To utilize this type of demodulator the armature winding of the exciters 136 and 139 of FIG. 7 should be wound in the manner shown in FIG. 9. For example, the armature of each of the exciters should include a winding 160 connected to the centertap of a winding 161 in each phase of the armature. The winding 160 is wound in an opposite phase relationship with the top portion 161A of the winding 161 as shown by the conventional dot polarity markings as shown. Thus, the output signals in the windings 160 are 180° out of phase with the output signals from the windings 161 in the respective phases of the armature. Six diodes 163—168 are coupled between the armature winding of the exciter and a pair of output terminals 170 which are coupled to the alternator field winding of the respective phase. A pair of resistors 171 and 172 are coupled between the neutral or ground wire 173 and each of the output terminals as shown. Two three-phase demodulators of the type shown in FIG. 9 are required in the apparatus of FIG. 7 to couple the exciters 136 and 139 to the two-phase field windings of the alternator 10. Where the alternator 10 is designed with a polyphase field having more than two phases, a three-phase demodulator of the type shown in FIGS. 8 and 9, a separate exciter will be required for each phase of the alternator field.

Figure 10:
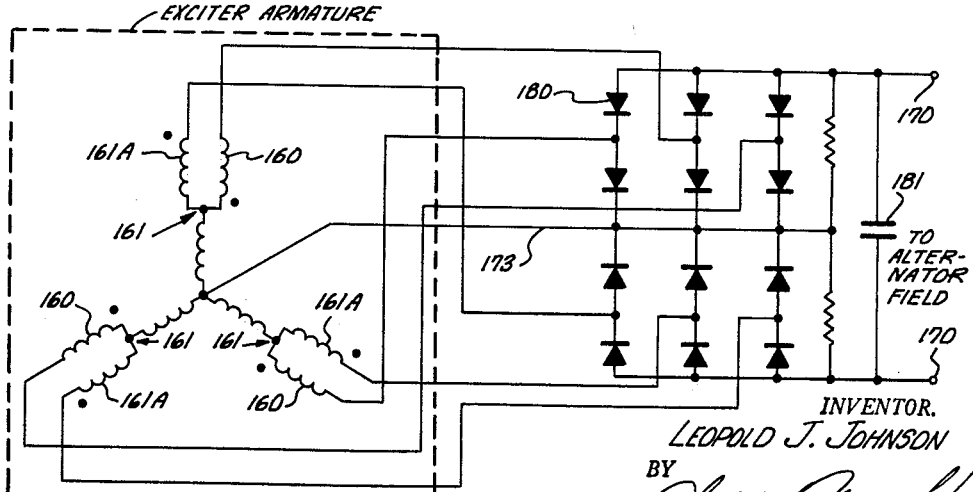
FIG. 10 is a schematic circuit diagram of a three-phase full-wave demodulator and may be utilized in the apparatus of FIG. 7.

FIG. 10 illustrates a full-wave three-phase demodulator which is similar to the demodulator shown in FIG. 9, except that 12 diodes (180) are connected between the armature of the exciter and the output terminals 170 as shown. Again, the exciter armature must be arranged in the same manner as described in reference to FIG. 9. A capacitor 181 is connected across the output terminals 170 for reducing the ripple content of the output wave.

I claim:

1. In an apparatus for correcting for unbalanced armature currents in a controlled frequency alternator system the combination which comprises a non-salient pole alternator having a polyphase armature for producing an alternating current output and a plurality of field windings for producing a polyphase magnetic field for the armature, driving means for producing rotary motion between the armature and the field windings, reference signal generating means for producing a first reference signal of a predetermined frequency and control means coupled to the driving means, the reference signal generating means and to the field windings for applying signals to the field windings to control the direction and speed of rotation of the magnetic field produced by the field windings and thereby control the frequency of the alternating current which is produced by the armature in accordance with the frequency of the first reference signal, the control means being arranged to continuously provide a low impedance current path to currents generated in the field windings as a result of unbalanced currents in the polyphase armature and thereby to provide improved phase voltage balance in the armature.

2. The combination defined in claim 1 wherein the control means is arranged to continuously provide a current path across the field windings which has a lower impedance than the impedance of the field windings at the frequency of the first reference signal.

3. The combination defined in claim 1 wherein the control means includes sensing means coupled to the driving means for producing a second reference signal having a frequency which is proportional to the speed of rotation between the field windings and the armature, means coupled to one of the sensing means and reference signal generating means for producing a third reference signal that is 90° out of phase with the signal produced by said one of the sensing means and reference signal generating means, and phase-sensitive demodulator means having a separate input circuit coupled to each of the first, second and third reference signals and a separate output circuit coupled to the field windings of each phase of the alternator field to apply signals which are 90° out of phase to each phase of the alternator field and which have a frequency that is proportional to the difference between the frequencies of the first and second reference signals.

4. In an apparatus for correcting for unbalanced armature currents in a controlled frequency alternator system the combination which comprises a non-salient pole alternator having a polyphase armature for producing an alternating current output and at least two field windings for producing a polyphase magnetic field for the armature, driving means for producing rotary motion between the armature and the field windings, reference signal generating means for producing a reference signal of a predetermined frequency, tachometer means coupled to the driving means and including at least one armature winding for producing a signal representative of the speed of rotation of the armature relative to the field windings, means including at least two phase-sensitive demodulators coupled to the reference signal generator, the tachometer winding and to the field windings to apply signals to each of the field windings which have a frequency that is proportional to the difference between the frequencies produced by the reference signal generating means and by the tachometer means to control the direction and speed of rotation of the magnetic field produced by the field windings, each of the demodulators being arranged continuously to connect the field windings to the tachometer winding, the tachometer winding being arranged to have a lower impedance than the impedance of one of the field windings.

5. In an apparatus for correcting for unbalanced armature currents in a controlled frequency alternator system the combination which comprises a non-salient pole alternator having a polyphase armature for producing an alternating current output and at least two field windings for producing a two-phase magnetic field for the alternator armature, first driving means for producing rotary motion between the alternator armature and the alternator field windings, a signal generator for producing an electrical reference signal of a predetermined frequency, a tachometer coupled to the first driving means and having at least two windings for producing signals in each of the windings thereof which are 90° out of phase and which have a frequency that is proportional to the speed of rotation of the armature relative to field windings of the alternator, first and second exciters, each of the exciters having a field winding and at least one armature winding, second driving means for producing rotary motion between the armature and field winding of each of the first and second exciters, first phase-sensitive demodulator means coupled to the reference signal generator, one of the windings of the tachometer and to the field winding of the first exciter for applying a signal to the first exciter field winding which has a frequency that is proportional to the difference between the frequency of the signals generated in the reference signal generator and the tachometer winding, second phase-sensitive demodulator means coupled to the reference signal generator, the other winding of the tachometer and the field winding of the second exciter for applying a signal to the second exciter field winding which has the same frequency as the signal applied to the first exciter field winding and which is 90° out of phase therewith, third phase-sensitive demodulator means coupled between the armature of the first exciter and one of the field windings of the alternator for applying a signal to said one field winding of the alternator which has the same frequency as the signal applied to the field winding of the first exciter and fourth phase-sensitive demodulator means coupled between the armature of the second exciter and the other field winding of the alternator for applying a signal to said other field winding which has the same frequency and is 90° out of phase with the signal applied to said one field winding of the alternator.

6. The combination as defined in claim 5 wherein the first and second demodulator means are arranged to apply a signal having a sinusoidal wave form to the first and second exciter field windings and wherein the third and fourth demodulator means are arranged to continuously connect the field windings of the alternator to the respective armature windings of the first and second exciters to provide a continuous path for currents induced in the alternator field windings as a result of unbalanced armature currents and thereby provide improved phase voltage balance in the polyphase armature of the alternator with unbalanced loads.

7. The combination defined in claim 6 wherein the armature windings of the first and second exciters have a lower impedance than the impedance of the field windings of the armature.

8. The combination defined in claim 7 wherein each of the third and fourth demodulator means include a plurality of controlled rectifiers and signal generating means coupled to the driving means and to the control rectifiers for applying gating signals representative of the speed of the first and second exciters to the control rectifiers.

9. The combination defined in claim 7 wherein each of the third and fourth demodulators means include a commutator coupled to the second driving means.

10. The combination defined in claim 7 wherein each of the first and second exciters include a three-phase armature winding.

11. The combination defined in claim 10 wherein each of the armature windings of the first and second exciters are constructed to have an impedance which is less than one-half the impedance of the field winding of the alternator coupled to the respective exciter armature at the frequency of the alternating current output from the armature of the alternator.

12. The combination defined in claim 10 wherein each of the third and fourth demodulator means comprise a three-phase commutator coupled to the second driving means.

13. In an apparatus for correcting for unbalanced armature currents in a controlled frequency alternator system the combination which comprises a non-salient pole alternator having a polyphase armature for producing an alternating current output and a plurality of field windings for producing a polyphase magnetic field for the alternator armature, first driving means for producing rotary motion between the armature and the field windings of the alternator, a signal generator for producing a first electrical reference signal of a predetermined frequency, a tachometer coupled to the first driving means for producing a second reference seignal having a frequency that is proportional to the speed of rotation of the armature relative to the field windings of the alternator, an exciter associated individually with each phase of the alternator field, each of the exciters having an armature and at least one field winding, second driving means for producing rotary motion between armature and the field windings of each of the exciters, first phase-sensitive demodulator means coupled individually between each of the exciter field windings, and the reference signal generator and the tachometer for applying control signals to each field winding of the exciters which have a frequency that is proportional to the difference between the frequencies of the first and second reference signals, each of the first demodulator means being arranged so that the control signals applied to the field winding of each exciter have a predetermined phase relationship with respect to the control signals applied to the field winding of the other exciters, and second phase-sensitive demodulator means coupled individually between the armature of each exciter and the field windings of the respective phase of the alternator field for continuously connecting the armature of each exciter to the field windings of the respective phase of the alternator field in an alternating polarity sequence to control the speed and direction of rotation of the magnetic field for the alternator armature and thereby the frequency of the alternating current which is produced by the alternator armature, each of the exciter armatures being constructed and arranged to have a lower impedance than the impedance of the field windings of the respective phase of the alternator to provide a low impedance current path to currents generated in the field windings of the alternator as a result of unbalanced currents in the polyphase armature of the alternator and thereby to provide improved phase voltage balance in the alternator armature.

14. The combination defined in claim 13 wherein the first and second driving means comprise a single prime mover.

15. The combination defined in claim 14 wherein the second demodulator comprises a plurality of commutators coupled to the prime mover.

No references cited.

UNITED STATES PATENT OFFICE
CERTIFICATE OF CORRECTION

Patent No. 3,012,185                                December 5, 1961

Leopold J. Johnson

It is hereby certified that error appears in the above numbered patent requiring correction and that the said Letters Patent should read as corrected below.

Column 6, line 65, for "primer" read -- prime --; line 72, for "96" read -- 86 --; column 7, line 6, for "alterntaor" read -- alternator --; line 58, for "exicter" read -- exciter --; column 10, line 32, for "seignal" read -- signal --.

Signed and sealed this 8th day of May 1962.

(SEAL)
Attest:

ERNEST W. SWIDER                                      DAVID L. LADD
Attesting Officer                                             Commissioner of Patents